(12) United States Patent
Oostlander et al.

(10) Patent No.: US 8,285,800 B2
(45) Date of Patent: Oct. 9, 2012

(54) SERVICE MODEL CREATION USING MONITORED DATA OF THE PERFORMANCE MANAGEMENT TOOL

(75) Inventors: Bart Oostlander, Northville, MI (US);
William Noble, South Lyon, MI (US);
Bryce Dunn, Royal Oak, MI (US);
Murali Mogalayapalli, Novi, MI (US);
Stephen Kowal, Novi, MI (US)

(73) Assignee: Compuware Corporation, Detroit, MI (US)

( * ) Notice: Subject to any disclaimer, the term of this patent is extended or adjusted under 35 U.S.C. 154(b) by 208 days.

(21) Appl. No.: 12/823,516

(22) Filed: Jun. 25, 2010

(65) Prior Publication Data
US 2011/0320540 A1 Dec. 29, 2011

(51) Int. Cl.
*G06F 15/16* (2006.01)
(52) U.S. Cl. ........ 709/206; 709/230; 709/218; 709/223; 709/202; 370/255; 714/13; 714/16; 715/234; 715/205; 715/760
(58) Field of Classification Search .................. 709/206, 709/226
See application file for complete search history.

(56) References Cited

U.S. PATENT DOCUMENTS

| | | | | |
|---|---|---|---|---|
| 7,761,844 B2 * | 7/2010 | Bove et al. | ..................... | 717/106 |
| 8,006,130 B2 * | 8/2011 | Kanso et al. | ..................... | 714/13 |
| 2004/0034552 A1 * | 2/2004 | Cole et al. | ......................... | 705/7 |
| 2006/0123393 A1 * | 6/2006 | Atkins et al. | .................. | 717/121 |
| 2006/0242195 A1 * | 10/2006 | Bove et al. | ................ | 707/103 R |
| 2008/0312982 A1 * | 12/2008 | Braun et al. | ...................... | 705/7 |
| 2010/0318658 A1 * | 12/2010 | Zorn et al. | .................... | 709/226 |

* cited by examiner

*Primary Examiner* — Jude Jean Gilles
(74) *Attorney, Agent, or Firm* — Harness, Dickey & Pierce, PLC

(57) ABSTRACT

An automated method is provided for constructing or updating a service model that defines the entities in an enterprise's computing environment. The method includes: defining a group of templates for updating the service model, where the group of templates identify different types of entities which comprise the service model and relationships between the types of entities including an entity that links software applications to respective computing infrastructure that supports the software applications; monitoring messages received from monitoring tools residing in the computing environment; and updating a service model in accordance with the group of templates using data encapsulated in the messages.

19 Claims, 14 Drawing Sheets

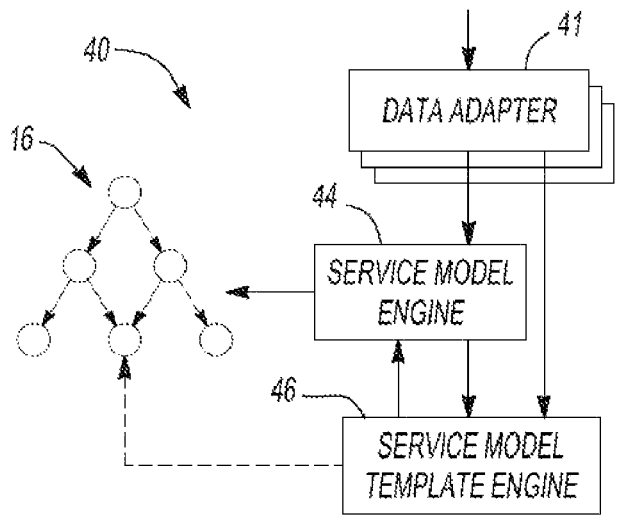
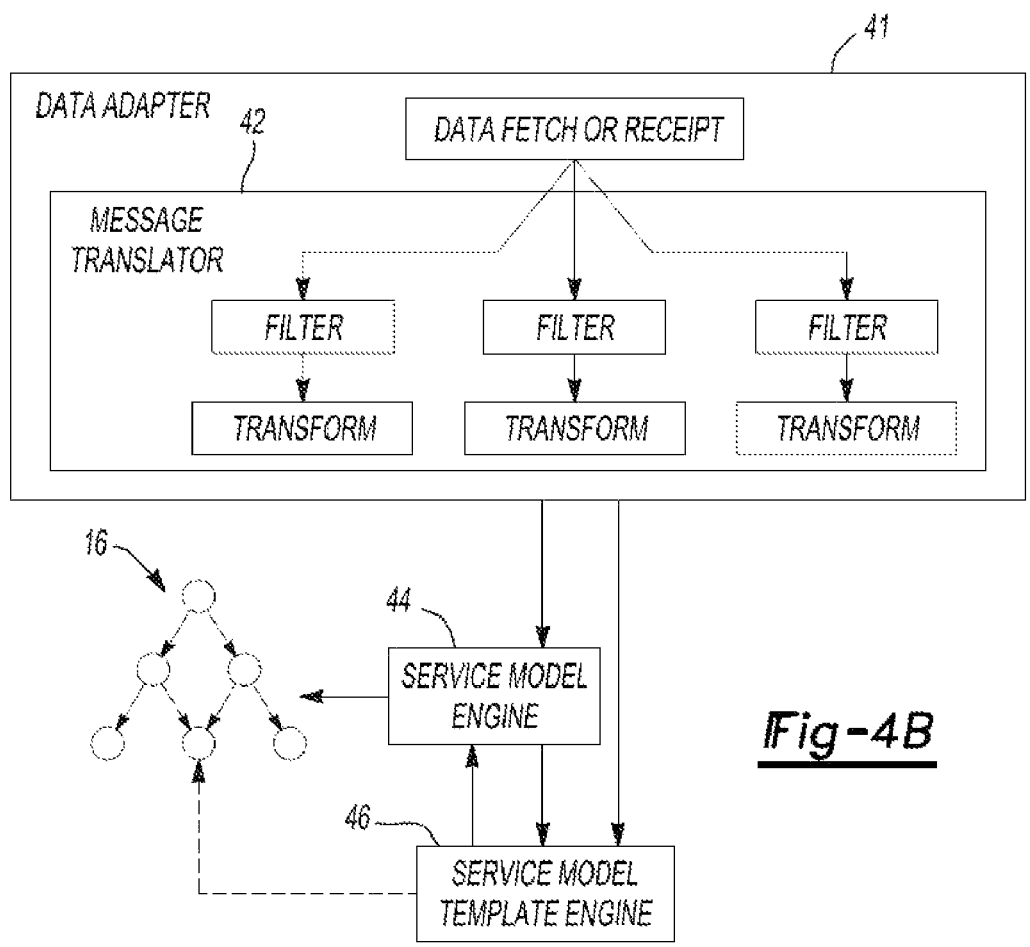

Message Mapping

Connection: Vantage End User Experience
Message Formats: TransactionMetric — Manage Formats Application Location Transaction Performance Fields | Metrics | Filters

| Name | Field Mapping |
|---|---|
| * ApplicationID | [ApplicationName] |
| * LocationID | [LocationID] |
| * TransactionID | [UpaDrilldownBase] |
| * XYZ | [UpaDrilldownBase] |
| UpaDrilldownBase | [UpaDrilldownBase] |
| ApplicationName | [ApplicationName] |
| PollTypeName | [PollTypeName] |
| PollTypeValue | [PollTypeValue] |
| TransactionName | [TransactionName] |

Message Field:
AnalyzerGroup
ApplicationName
AreaLocation
BackendAnalyzerGroup
CompleteMetricName
ConnectionID
FrontendAnalyzerGroup
LocationID
LocationHierarchy
LocationName
LocationNameHierarchy
LocationType
MetricID
MetricName Select Model Template:
- Application Locat..
- Location Perform..
- Application
- Application Trans..
- Application Locat..
- Locations
- Application Trans..
- Application Locat..
- Location Synth...
- Application Locat..
- Applications
- Application Synth..
- Application Locat..
- Application Trans..
- Application Perfo..
- Location
- Application Trans..

*Fig-6B*

SERVICE MODEL CREATION USING MONITORED DATA OF THE PERFORMANCE MANAGEMENT TOOL

FIELD

The present disclosure relates to an automated method for creating and updating a service model used by a performance management tool.

BACKGROUND

Information technology organizations have long had the problem of understanding how their infrastructure supports particular business services. This is important for prioritization of work, understanding business impact, planning change and the like. It is also important for finding and fixing problems that are impacting end users. If end users report problems, the IT teams need to know where to look.

Known solutions leveraged a configuration management database. This is a database where configuration information could be stored. The configuration management database is outlined by the ITIL framework. The problem with the configuration management database is that it is very expensive and time consuming to set up (e.g., multiple years for most organizations) and quickly gets out of date. It also requires costly integration to all of the monitoring tools and the service desk. To try and solve this problem, dedicated discovery technologies could also be deployed. These discovery technologies could be used to understand what infrastructure is talking to what, but they lacked an application context and are error prone.

This section provides background information related to the present disclosure which is not necessarily prior art.

SUMMARY

An automated method is provided for constructing or updating a service model that defines the entities in an enterprise's computing environment. The method includes: defining a group of templates for updating the service model, where the group of templates identify different types of entities which comprise the service model and relationships between the types of entities including an entity that links software applications to respective computing infrastructure that supports the software applications; monitoring messages received from monitoring tools residing in the computing environment; and updating a service model in accordance with the group of templates using data encapsulated in the messages.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIGS. 4A-4D are diagrams depicting a subsystem for creating and updating the service model 16 in an automated manner;

FIG. 6B illustrates an exemplary message mapping interface for linking an attribute with a message field from which to get the value for the attribute;

Figure 8A:
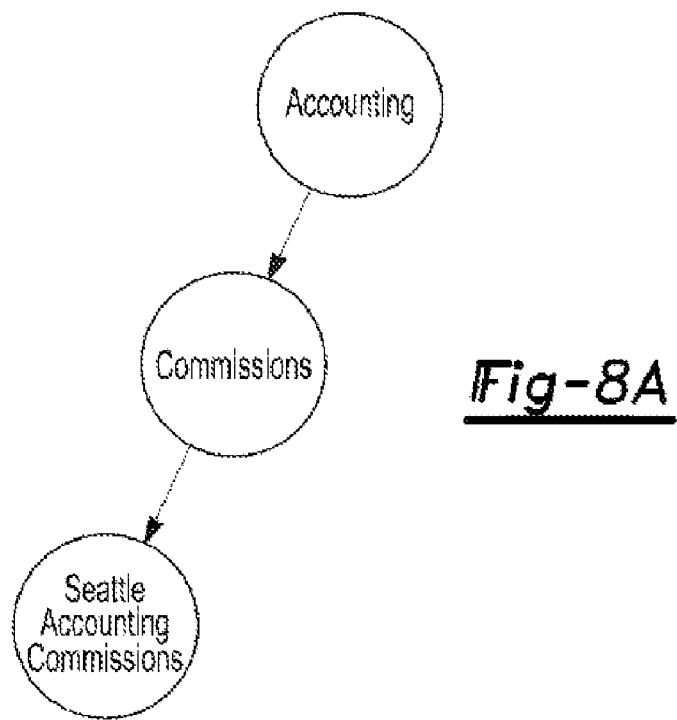
Figure 8B:
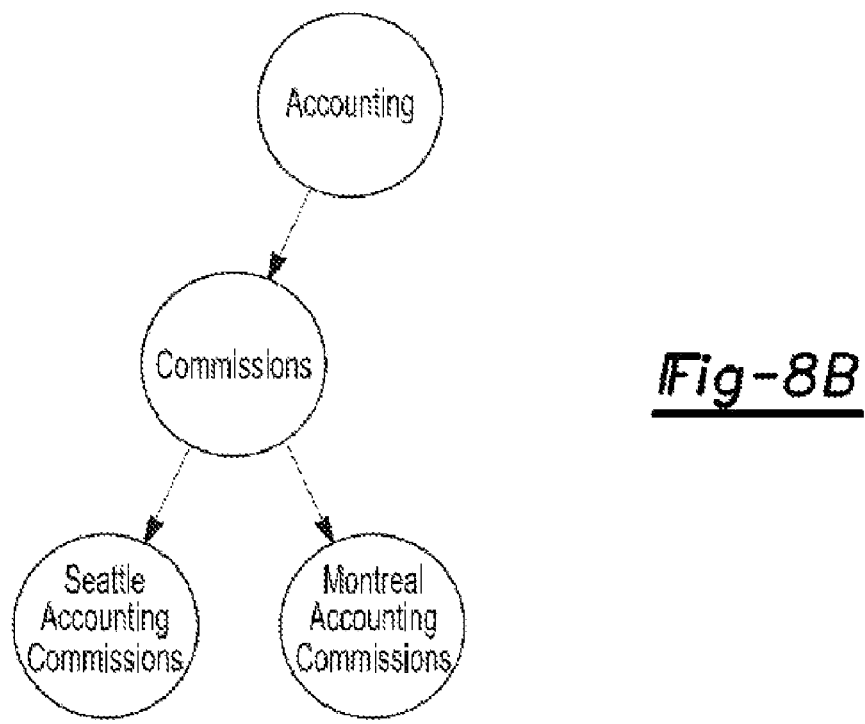
Figure 8C:
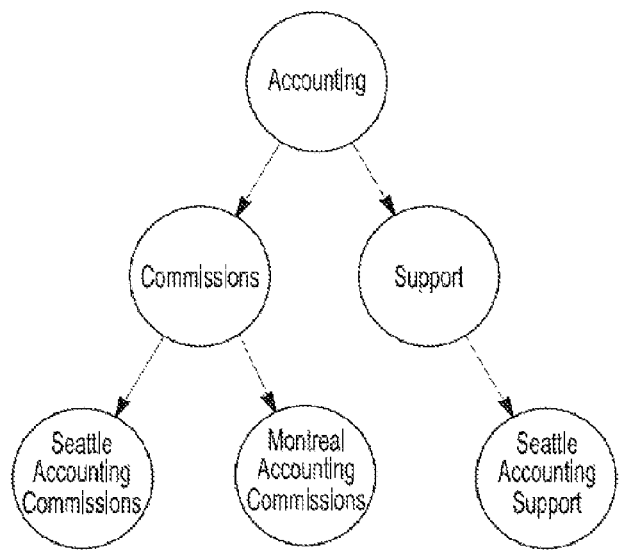
Figure 8D:
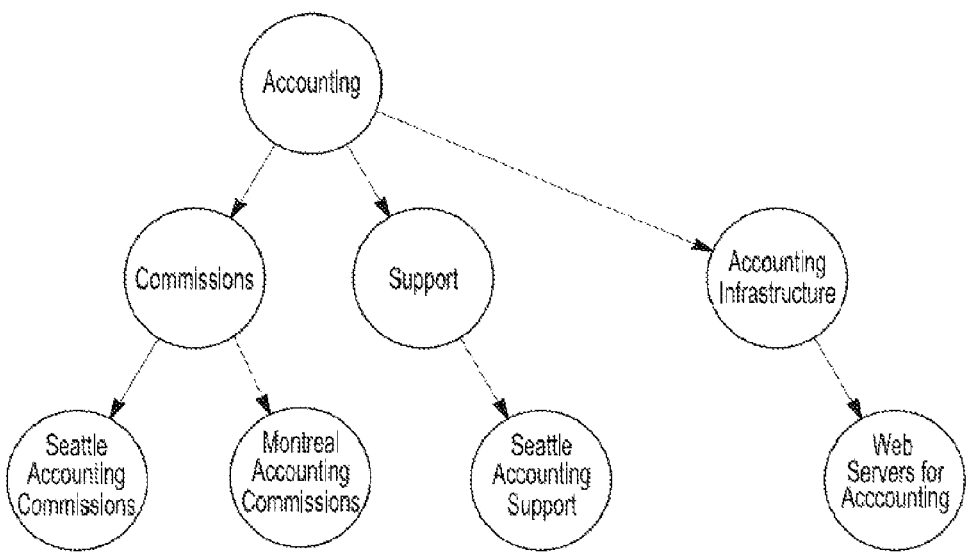
Figure 8E:
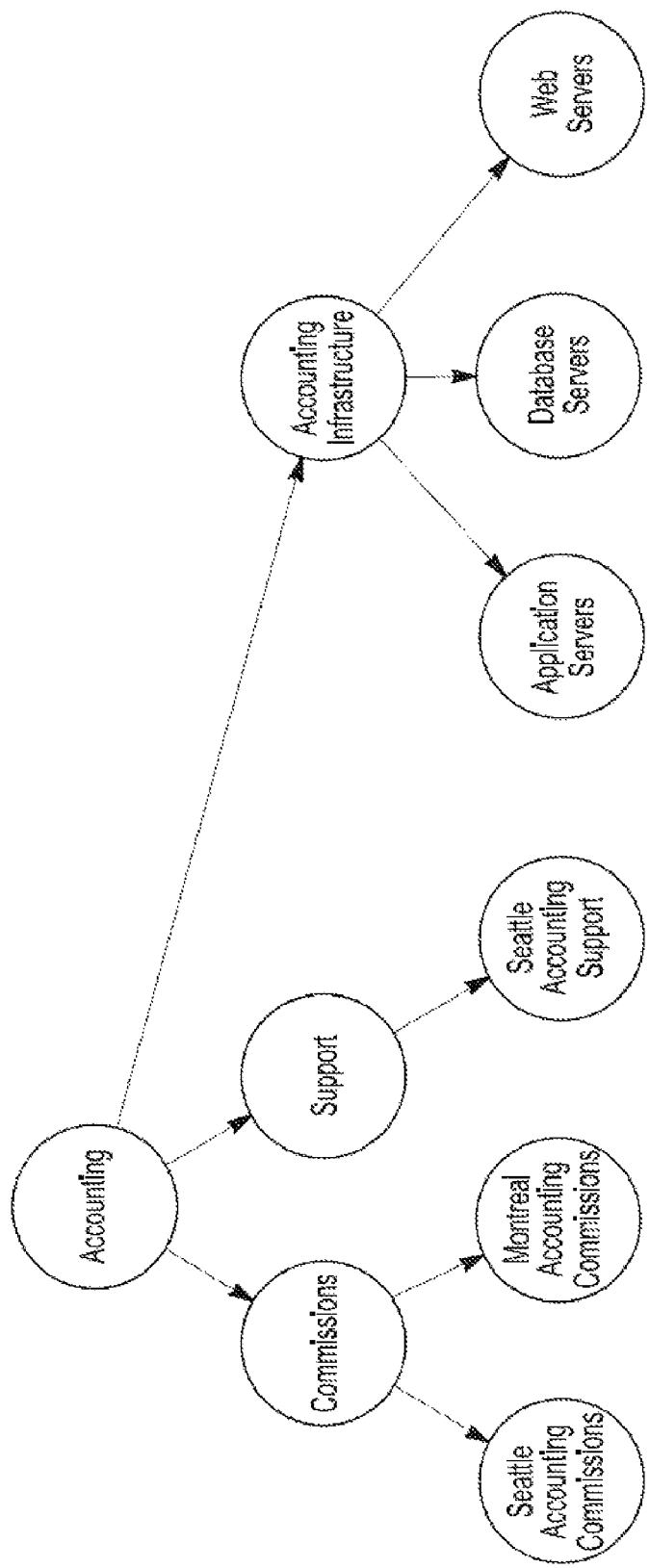
Figure 9:
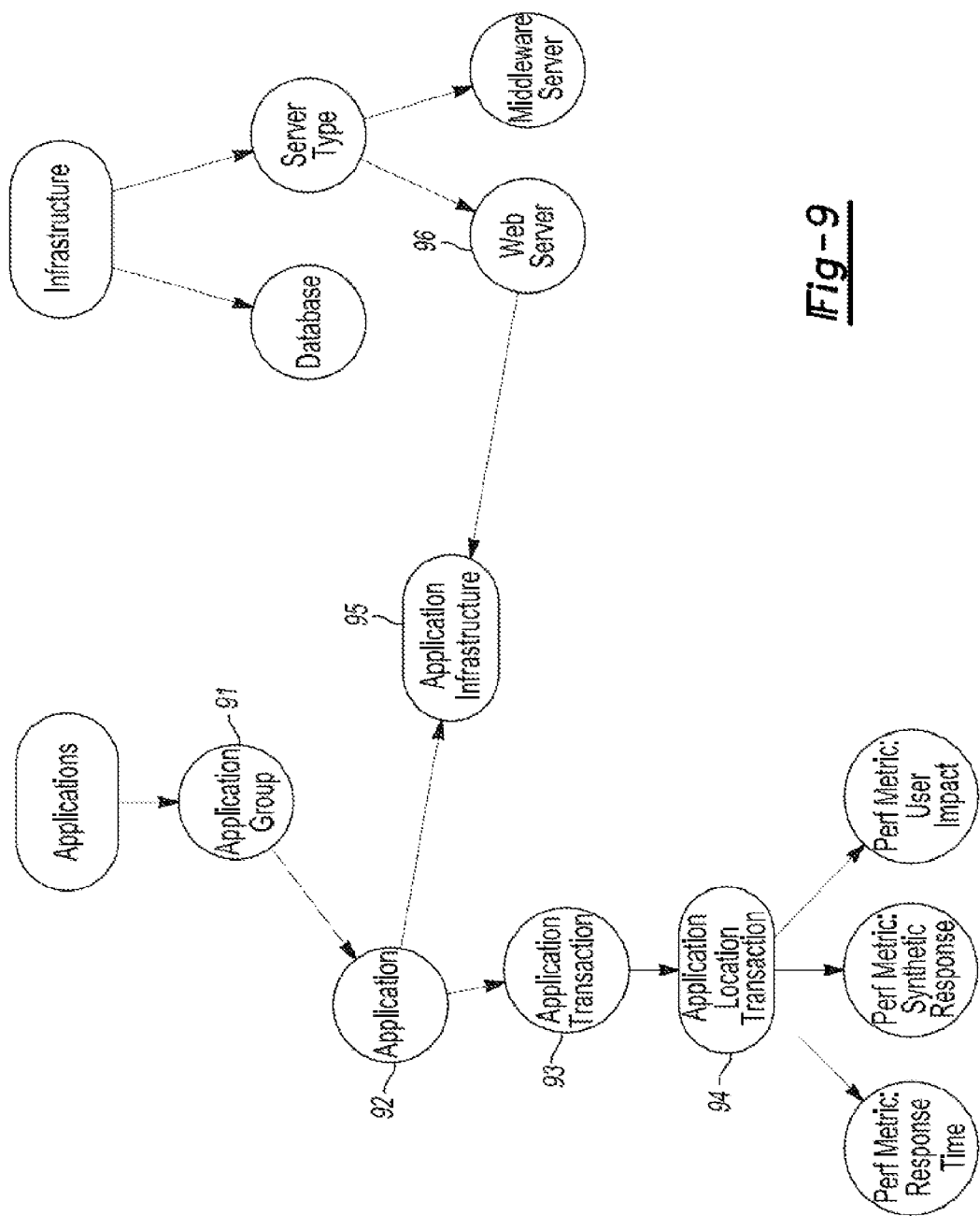
Figure 10B:
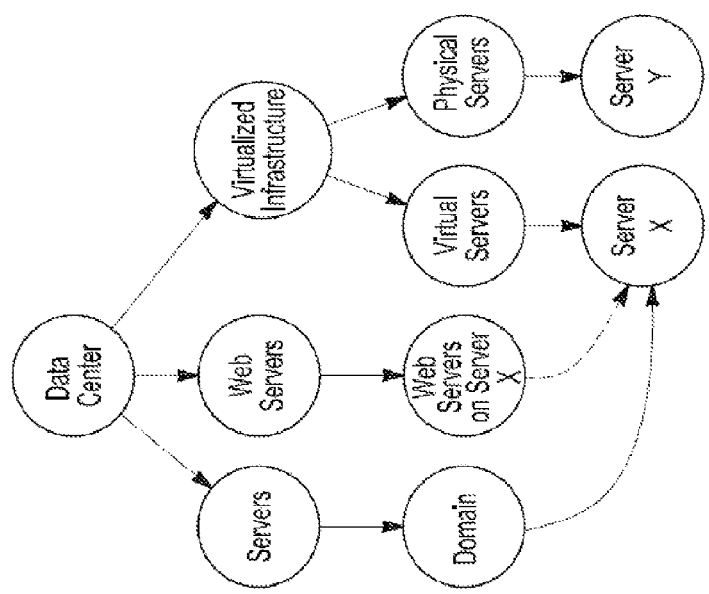
Figure 10A:
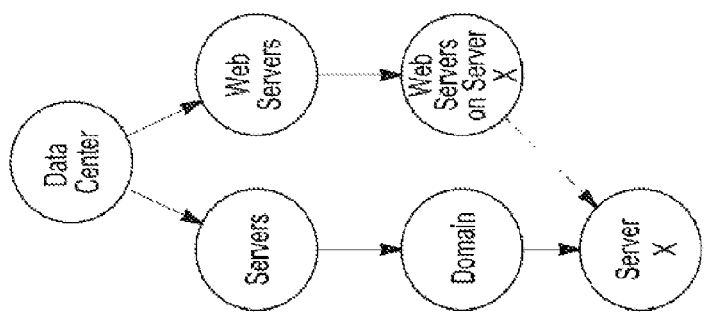

FIGS. 8A-8E illustrating the construction of an exemplary service model by the model service model template engine FIG. 9 is a diagram of an exemplary hierarchical structure of the entities comprising the service model templates; and FIGS. 10A and 10B are diagrams illustrate an example of the service model template engine automatically reclassifies entities and updating the service model accordingly.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
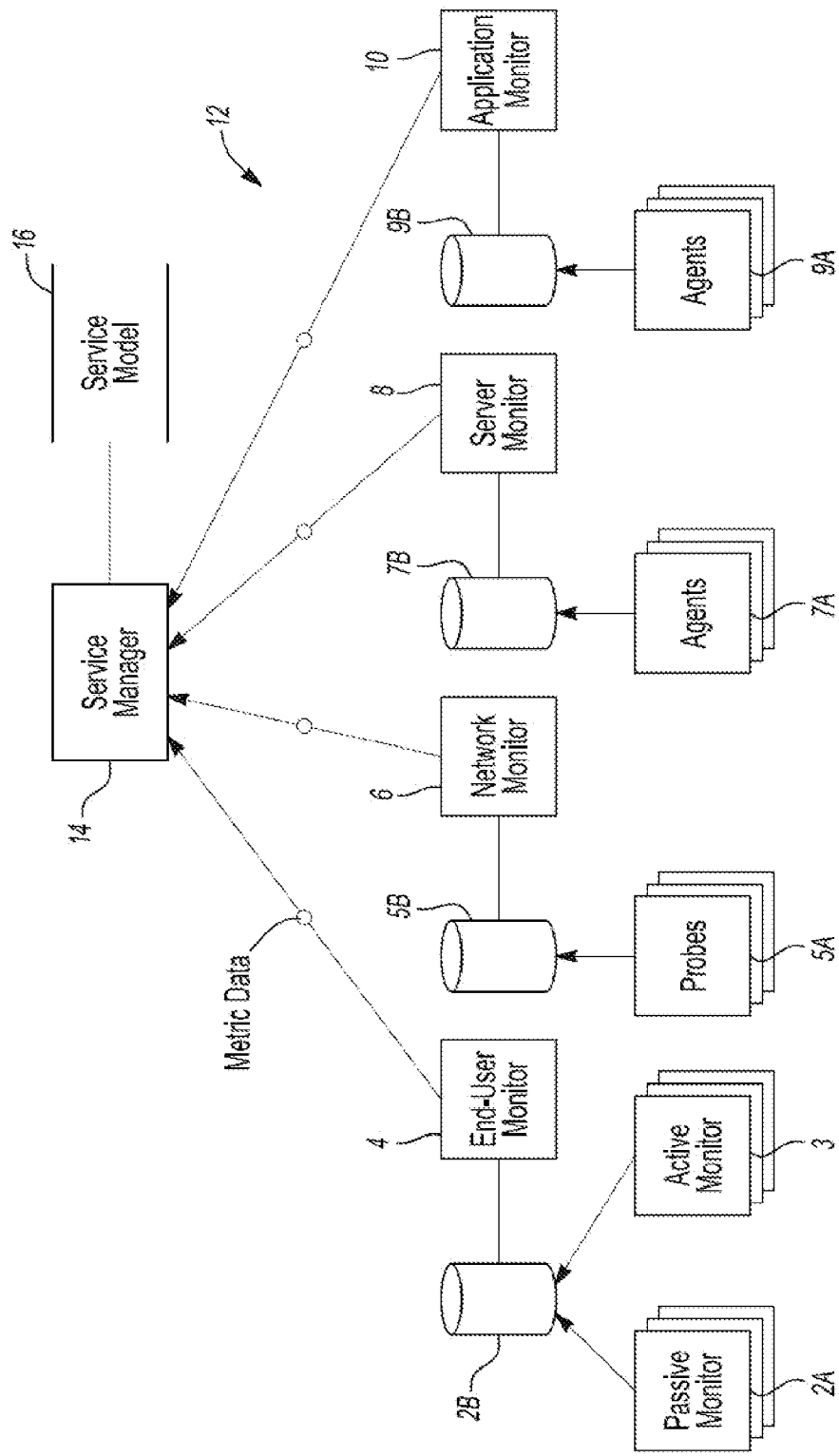
FIG. 1 is a diagram depicting an exemplary performance monitoring tool.

FIG. 1 depicts an exemplary performance management tool 12 that monitors performance of software applications in a computing environment. The performance management tool is comprised generally of a service manager 14, a service model 16, and a plurality of different monitoring tools 18. The performance management tool 12 may include other components. The VANTAGE software product commercially available from Compuware Corporation is an exemplary performance management tool. While the following description is provided with reference to the VANTAGE software product and accompanying software offerings, it is readily understood that the teachings of this disclosure are applicable to other performance management tools, such as FOGLIGHT tool from Quest Software and ITCAM tool from IBM. Moreover, it is understood that the VANTAGE software product may be interfaced with monitoring tools from other third party vendors.

The service manager 14 processes and distills data from disparate sources to present a real-time (or near real-time) view of service quality and performance of software applications which comprise an enterprise's computing environment. Performance data may be gathered using different types of monitoring tools 18 as will be further described below.

End-user monitoring may be accomplished using one of two methods. Agentless monitoring measures application response times experienced by each user of an application as well as other related performance metrics. In this approach, monitoring software 2A passively (i.e. in an agentless fashion) collects data anywhere in the network from one or more centralized locations. In other words, the monitoring software does not reside on the end-users computing device. The monitoring software 2A in turn stores the collected data in a database 2B associated with the tool. The Client VANTAGE Agentless software available with the VANTAGE product offering is an example of this type of monitoring tool.

Active monitoring (i.e. synthetic) gauges response times for applications using monitoring software that typically resides on the end-users computing device or a dedicated workstation. The monitoring software 3 simulates user experiences using synthetic transactions, thereby providing "control" measurements that are especially important for assuring performance when actual usage is low. Likewise, the collected data may be stored in database 2B for subsequent reporting and analysis. The ClientVANTAGE Active software available with the VANTAGE product offering is an example of this type of monitoring tool.

Network monitoring tools monitor traffic on an enterprise's network. Network probes 5A are placed at different locations in the network. Each probe is a software component that passively collects data which may be used to derive performance metrics such as network throughput, bandwidth utilization, total bytes sent, server response time, etc. Other network performance related metrics are also contemplated by this disclosure. The collected data is then stored in a database 5B. The network monitoring tool may further include a software analysis component 6 that analyzes and compiles the data for subsequent reporting. The NetworkVANTAGE software available with the VANTAGE product offering is an example of this type of monitoring tool.

Server monitoring tools monitor metrics for physical or virtualized server machines. Software agents 7A are placed on each of the devices being monitored. The software agents 7A collect data which may be used to derive performance metrics such as CPU utilization, memory utilization, disk space availability and other server related performance metrics. The collected data is then stored in a database 7B. The server monitoring tool may further include a software analysis component 8 that analyzes and compiles the data for subsequent reporting. The ServerVANTAGE software available with the VANTAGE product offering is an example of this type of monitoring tool. Microsoft's Operations Manager is a comparable server monitoring tool.

Application performance monitoring tools monitor the performance and service availability of software applications running on physical or virtualized servers. Software agents 9A are placed on the servers that host the software applications. The software agents 9A collect data which may be used to derive performance metrics including CPU utilization by an application, memory utilization by an application or other application related performance metrics. The collected data is then stored in a database 9B. The application performance monitoring tool may further include a software analysis component 10 that analyzes and compiles the data for subsequent reporting. The VANTAGEAnalyzer software available with the VANTAGE product offering is an example of this type of monitoring tool. Computer Associates' Wily Customer Experience Manager is a comparable application performance monitoring tool.

Figure 2:
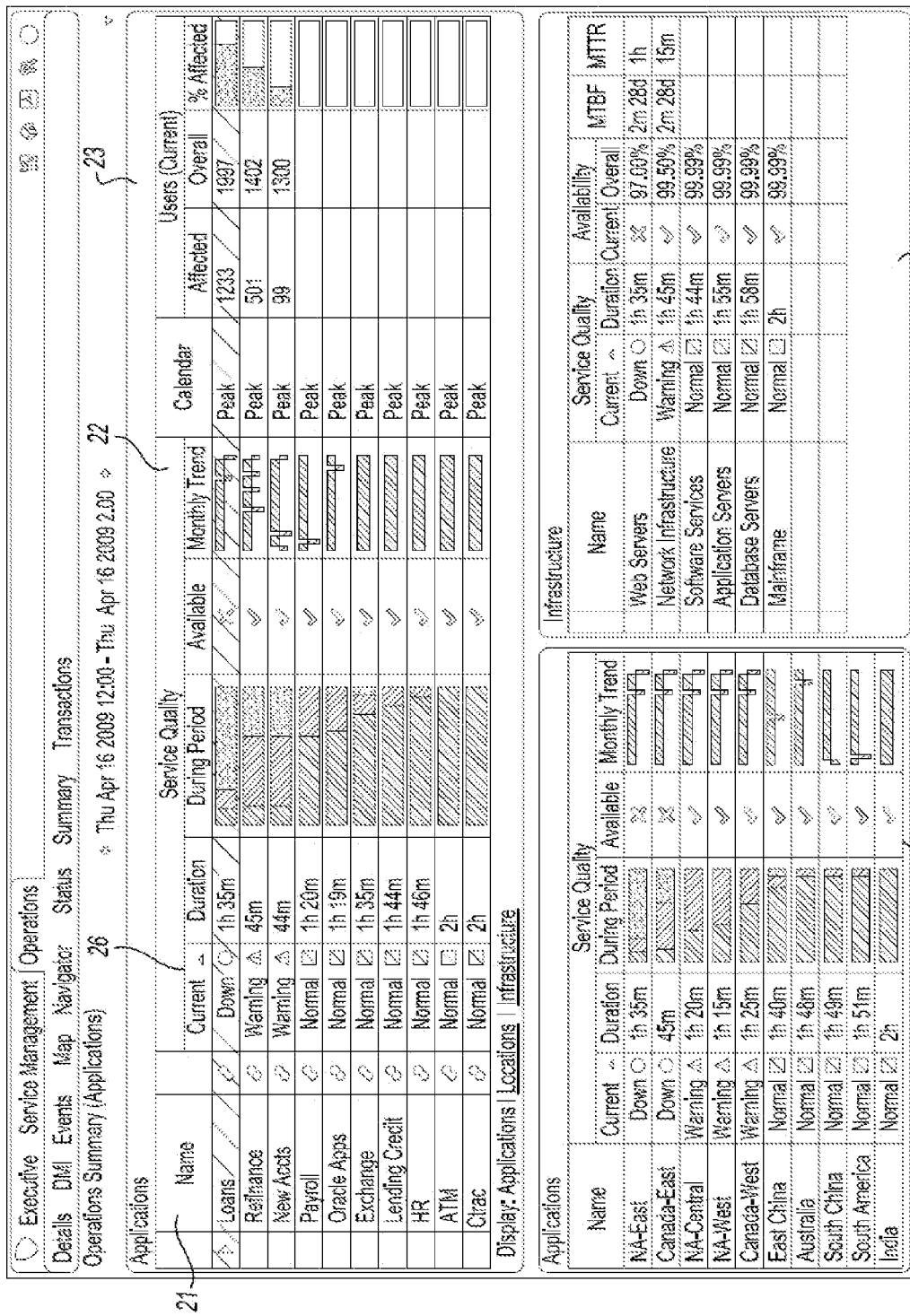
FIG. 2 illustrates an exemplary operations overview interface from a performance management tool.

The service manager 14 may use a dashboard concept to present service quality and performance indicators on a graphical user interface for each of the applications being monitored as shown in FIG. 2. In this example, the operations overview dashboard 20 presents service quality and performance indicators in real-time for each of the applications being monitored by the user. The names of the applications 21, along with various performance indicators 22, are listed in the top panel 23 of the interface. Additional panels may be used to present service quality indicators for different geographic locations 24 and/or different types of computing infrastructure 25.

One of the service quality indicators is the current state of service 26 provided by the application. Applications that are not currently experiencing any problems may have a normal state of service, such as the payroll application. When an application experiences a performance problem, the current state of service indicator will change states. For example, the current state of service indicator may indicate a warning condition as in the case of the refinance application or a non-operational (or down) condition as in the case of the loans application. Presented with this type of information, users can initiate an investigation into the source of a problem. An exemplary technique for identifying a cause of a performance problem experienced by an application is set forth in U.S. patent application Ser. No. 12/552,351 entitled "Performance Management Tool having Unified Analysis Report" which is incorporated herein by reference.

The service manager 14 relies upon a service model 16 residing in a data store (i.e., computer memory) to understand the relationship between the data and a given application. More specifically, the service model 16 is a data structure that maps each software application in the computing environment to the respective computing infrastructure that supports the software application. The service model may be represented by a connected acyclic graph. Other data structures for defining the service model are also within the broader aspects of this disclosure. For instance, a directed graph, a directed acyclic graph, one or more trees or another type of graph may be used to define the service model.

Figure 3:
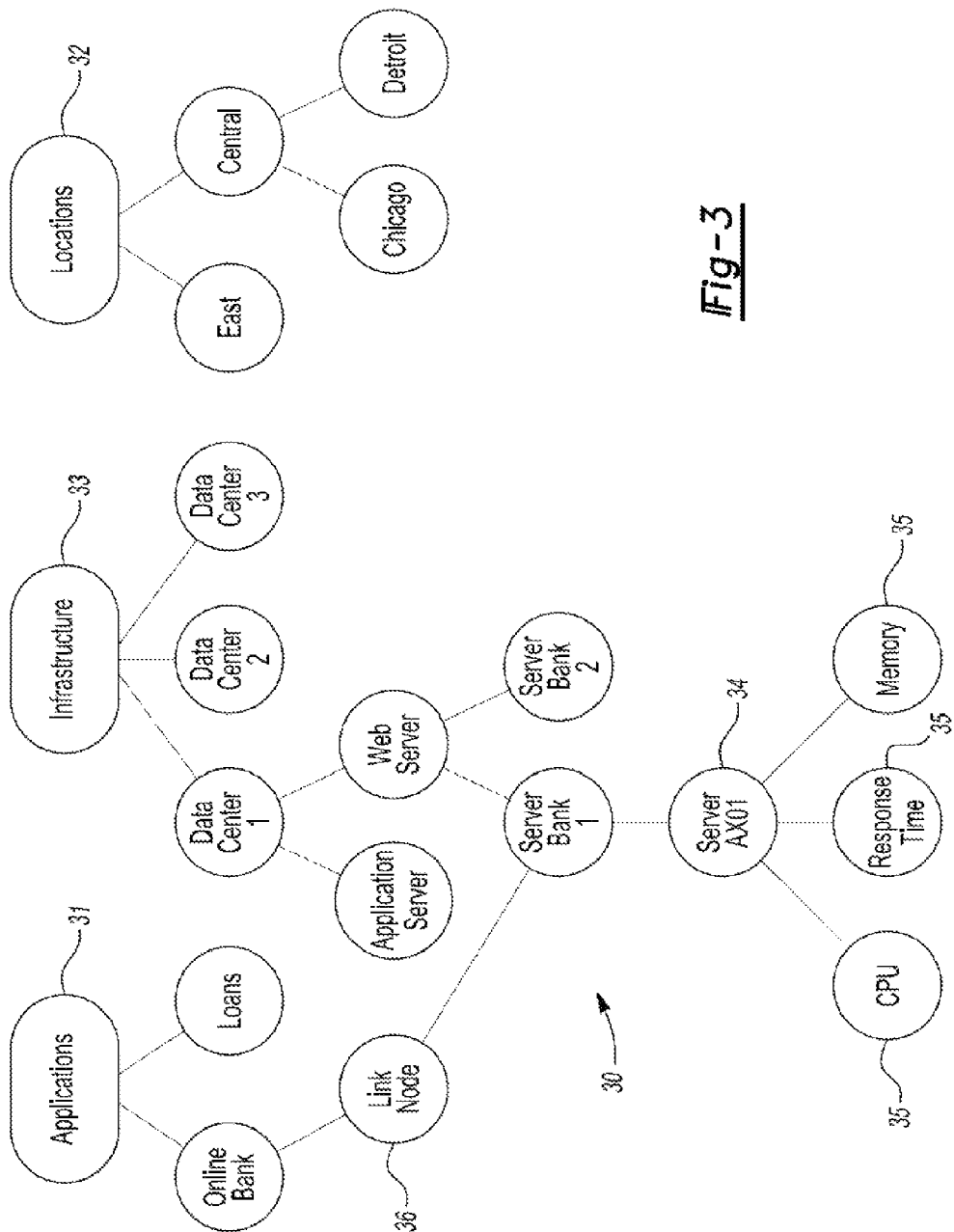
FIG. 3 is a diagram of an exemplary service model which may be employed by a performance management tool.

FIG. 3 illustrates an exemplary service model 30 which may be employed by the service manager 14. In an exemplary embodiment, the root nodes of the graph structure represent applications 31, the locations 32 of the users of the applications and the computing infrastructure 33 that supports the applications. The hierarchy for the branches extending from the root nodes may include more or less intermediate nodes depending upon the complexity and requirements of the enterprise. Other types of root nodes may also be included in the graph.

Branches extending from the application root node represent the hierarchy of application software with the leaf nodes representing the software functions available to end users or performance metrics associated with a particular software function identified by a parent node. Branches extending from the location root node represent the different geographical locations where the end users of the application software reside.

Branches extending from the infrastructure root node represent the hierarchy of computing components that comprise the computing environment, including web servers, application servers, databases, mainframe computers, network components, etc. Particular software services that support an application are defined at the tier immediately preceding the leaf nodes (i.e., parent nodes to the leaf nodes) indicated at 34. The leaf nodes 35 on the branches extending from the infrastructure root node represent the performance metrics associated with a particular software service and monitored by the performance management tool. An application infrastructure node designated at 36 is a particular type of intermediate node that links particular applications to the computing infrastructure that supports the particular application. These nodes are used to identify the software services and other computing infrastructure that supports a particular application.

Figure 4C:
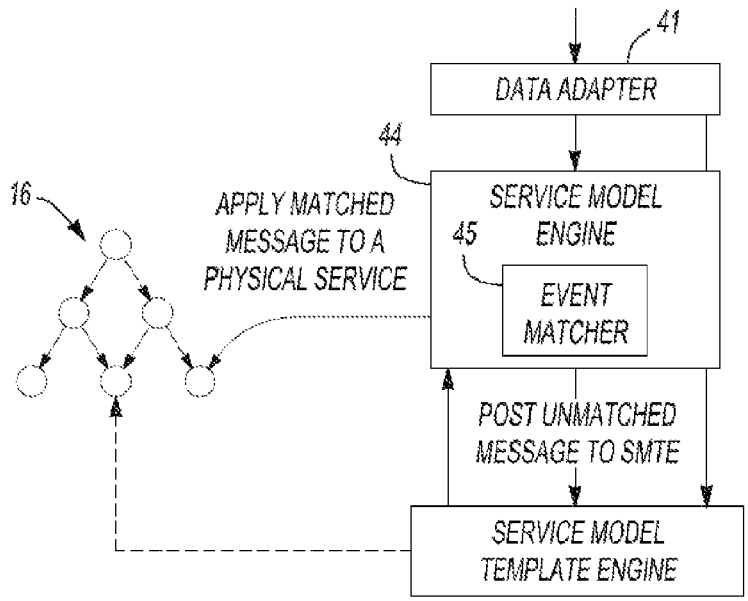
Figure 4D:
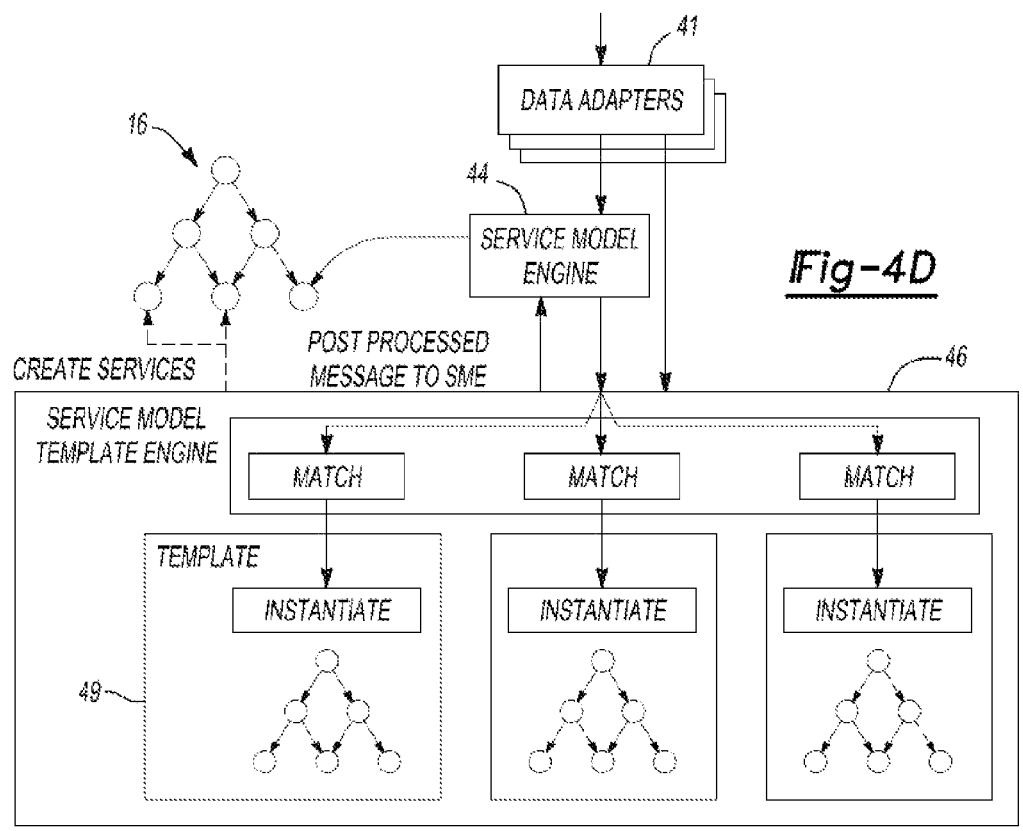

With reference to FIG. 4A, the service manager 14 includes a subsystem 40 for creating and updating the service model 16 in an automated manner. The subsystem 40 is comprised of three primary components: a service model engine 44, a service model template engine 46 and a plurality of data adapters 41. Each of these components may be implemented as one or more software modules (i.e., computer executable instructions) which reside in a computer memory and are executed by a computer processor. These components may also be implemented using application specific integrated circuits (ASIC), an electronic circuit, a combinational logic circuit, and/or other suitable components that provide the described functionality.

A data adapter 41 (DA) receives data from various monitoring tools and other types of data sources residing in a computing environment. The data adapter in turn forwards that information in the form of messages (directed to particular services) to the service model engine 44 or to the service model template engine 46. More specifically, a data adapter 41 captures the relevant data and translates it into one or more standardized messages that the service model engine 44 and service model template engine 46 can understand. The data adapter 41 must ensure that the relevant addressing information is included in the message so that the service model engine 44 can unambiguously identify the relevant entity in the service model 16. Furthermore, the data adapter 41 must translate any performance metrics into fields that the service model engine and service model template engine can recognize and associate with the correct performance attributes of the service.

This latter task is typically managed by the message translator 42, a distinct subcomponent of any data adapter. Message translators (MTs) are JavaScript scripts that can be freely modified by practitioners in the field. Their typical implementation generally consists of a set of filters that determine whether one or more messages should be created for the information obtained, and for what kind of services those messages are intended. Message translators 42 also contain a transformation routine for each filter, which produces messages in the proper format. Each routine modifies one or more aspects of the data to ensure that the relevant data for the targeted type of entity is available to the service model engine and service model template engine.

Data adapters 41 are executable components that the service manager loads into memory in order to be able to receive data from a particular data source. However, when data is to be received from different data sources of the same type, say, for different installations of SQL Server, the same SQL Server data adapter will need to be instantiated multiple times and each one must be configured to connect to its own SQL Server installation. The service manager use connections to manage this situation. A connection is the definition of a specific usage (i.e. instance) of a data adapter. It consists of a set of configuration settings, and is identified by a Connection ID. Some of those settings are generic across all connections, and some will be specific to the data adapters 41 it uses. Connections also serve an important role in the routing of messages from data adapters 41 to entities in the service model. Entities that receive messages are typically associated with a particular connection for a particular data adapter 41 to preserve the integrity of their metrics. Moreover, service model templates 49 are associated with particular connections as well. This allows the service model template engine 46 to select the proper template to determine what kind of entity should be instantiated for a particular type of message from a given source. So, where a message comes from is as important as the data it contains.

The service model engine 44 operates to keep the service model 16 up to date. The service model engine 44 matches the messages it receives from the data adapters 41 with the entities for which those messages are intended and updates those entities accordingly. Although the service model engine is principally updating performance metric data in the service model, it is understood that other aspect of the service model can also be updated by the service model engine 44. The event matcher 45 is the subcomponent of the service model engine 44 that performs this function.

Figure 5:
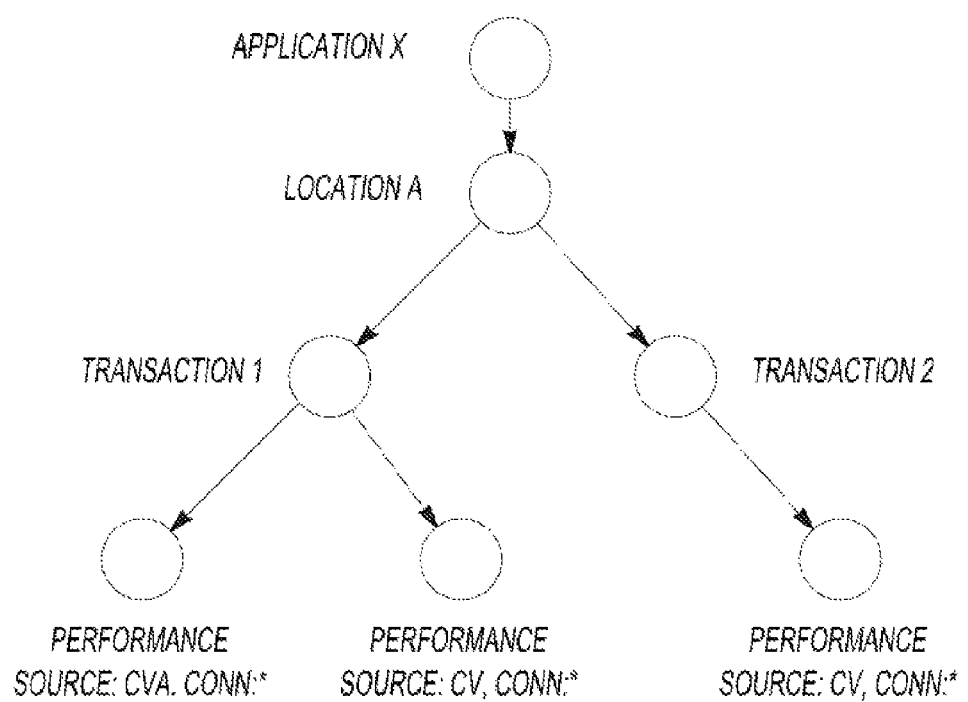
FIG. 5 is a diagram of a portion of a service model illustrating that the performance of a given transaction may be monitored by two different monitoring tools.

In an exemplary embodiment, the event matcher 45 uses three distinct pieces of information: (1) the event source, which refers to the data adapter that sent the message, (2) the Connection ID, which identifies a particular data adapter configuration, and (3) the Parameter ID, which identifies the targeted service and (typically) its place in the model. For instance, when several transactions are monitored for a particular location for a particular application, one transaction may be monitored by several tools at the same time. In the example diagrammed in FIG. 5, the performance of Transaction 1 is monitored by ClientVantage Agentless (CVA) as well as by ClientVantage Active (CV). The Parameter ID that identifies the target entity would be "ApplicationX\LocationA\Transaction1\Performance". But this is obviously still ambiguous as there are two entities with this identifier. However, the service model engine 44 will use the Connection ID and Event Source to resolve this ambiguity. It is able to do this, as this information was stored in each (physical) entity by the service model template engine 46 when it instantiated that entity in the service model 16. The service model template engine 46 obtained this information from an incoming message and also used it to determine which template to use to create entities from that message as will be further described below. When the event matcher 45 finds an unambiguous match, the service model engine 44 will parse all relevant data from the message and apply it to the targeted entity. This involves the entity's primary value (and potentially even the service quality directly) as well as its extended service metrics, insofar values for those are found in the message. However, if a match is not found, the message is posted to the service model template engine 46, as in all likelihood this condition indicates that a new entity is needed in the service model 16. Other types of identifiers may be used to uniquely identify a target entity in the service model.

The service model template engine 46 relies upon a series of service model templates 49 to instantiate entities in the service model 16. Service model templates 49 generally identify the different types of entities which can comprise the service model and define the relationships between the entities. The service model template engine can be configured with pre-defined service model templates that an IT specialist may use 'as is' or modify them using a graphical user interface provided by the tool. Alternatively, the IT specialist may use the interface to construct fully customized service model templates.

Each service model template 49 serves as a class for an entity of a particular type. For example, a template for an application entity will define the attributes common to all of the applications in the service model; whereas, a template for a server entity defines the attributes common to all of the servers in the service model. Thus, a service model template defines the attributes for the entity type.

In an exemplary embodiment, a service model template 49 includes a unique identifier for the entity type and a filter that specifies which messages to act upon for this entity. More specifically, the filter includes a source identifier that identifies a data source for messages having data pertaining to the entity, and a message format identifier that identifies a format type for the messages received from the data source. A service model template 49 may define other attributes as well. For example, a service model template 49 for an application may include a name for the application. Other types of attributes are contemplated for this entity and other entity types.

Figure 6A:
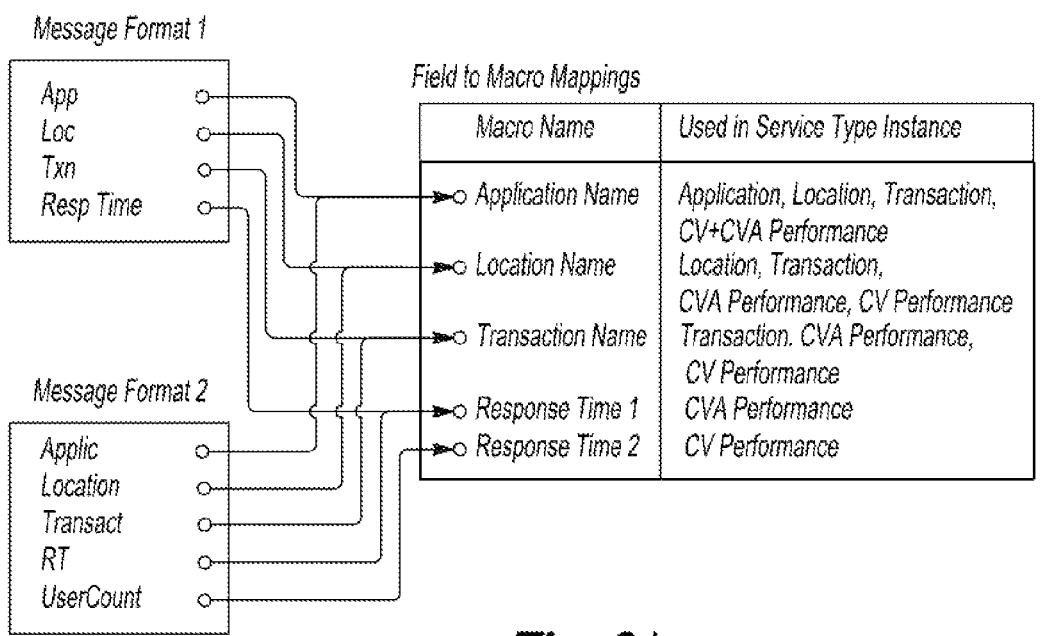
FIG. 6A is a diagram illustrating how template attributes can be linked to a message field.

In some instances, attributes defined by a service model template 49 have fixed values. In other instances, there are attributes in a template whose values are updated from the content of an applicable message. For these types of attributes, the IT specialist needs to link the attribute with a message field from which to get the value for the attribute. This message mapping process is illustrated in FIG. 6A. Application name, location name and transaction name are attributes whose value can come from either format type but note that the name of the field in the message is different amongst the two message formats. Furthermore, format type one provides a response time performance metric from one type of monitoring tool (e.g., ClientVANTAGE Agentless); whereas, format type two provides a response time performance metric from a different type of monitoring tool (e.g., ClientVANTAGE Active).

FIG. 6B illustrates an exemplary message mapping interface 60 that enables the specialist to perform this function. The specialist will first select an entity type from the listing of entities displayed in the scroll box 61 on the left of the interface. In this example, the service model template for an application_location_transaction entity is shown as being selected. Attributes for this entity are displayed in the primary window 62. ApplicationId, LocationId, TransactionId are attributes that must be mapped by the specialist; whereas, mapping for the remaining attributes is optional. Prior to mapping, the specialist must select the data source for messages having data pertaining to the entity and a format type for the message as indicated at 64. In this example, the specialist has selected a Connection Id indicated as the 'Vantage End User Experience' and a message format type designated as 'TransactionMetric'. Message fields associated with the selected message format type are then displayed in the scroll box 66 to the right of the primary window.

To link an attribute with a message field, the specialist selects a message field from the scroll box and drags the selected message field to the field mapping column adjacent to the desired attribute. For example, the Location Id attribute has been linked to the LocationID message field. When the service model engine updates the service model, the values from a linked message field will be extracted from the applicable message and assigned to the corresponding attributes in the service model. Other ways of linking an attribute with a message field from which to get the value for the attribute are envisioned within the scope of this disclosure.

Service model templates 49 also define the relationships between entity types. Relationships between entity types may be represented with a connected acyclic graph. Similar to the service model, other types of data structure can be used to represent the relationships between entity types. Instances of a given entity type can then be created by the service model template engine 46 in the service model 16 in accordance with the attributes and relationships defined by an applicable template.

Figure 7:
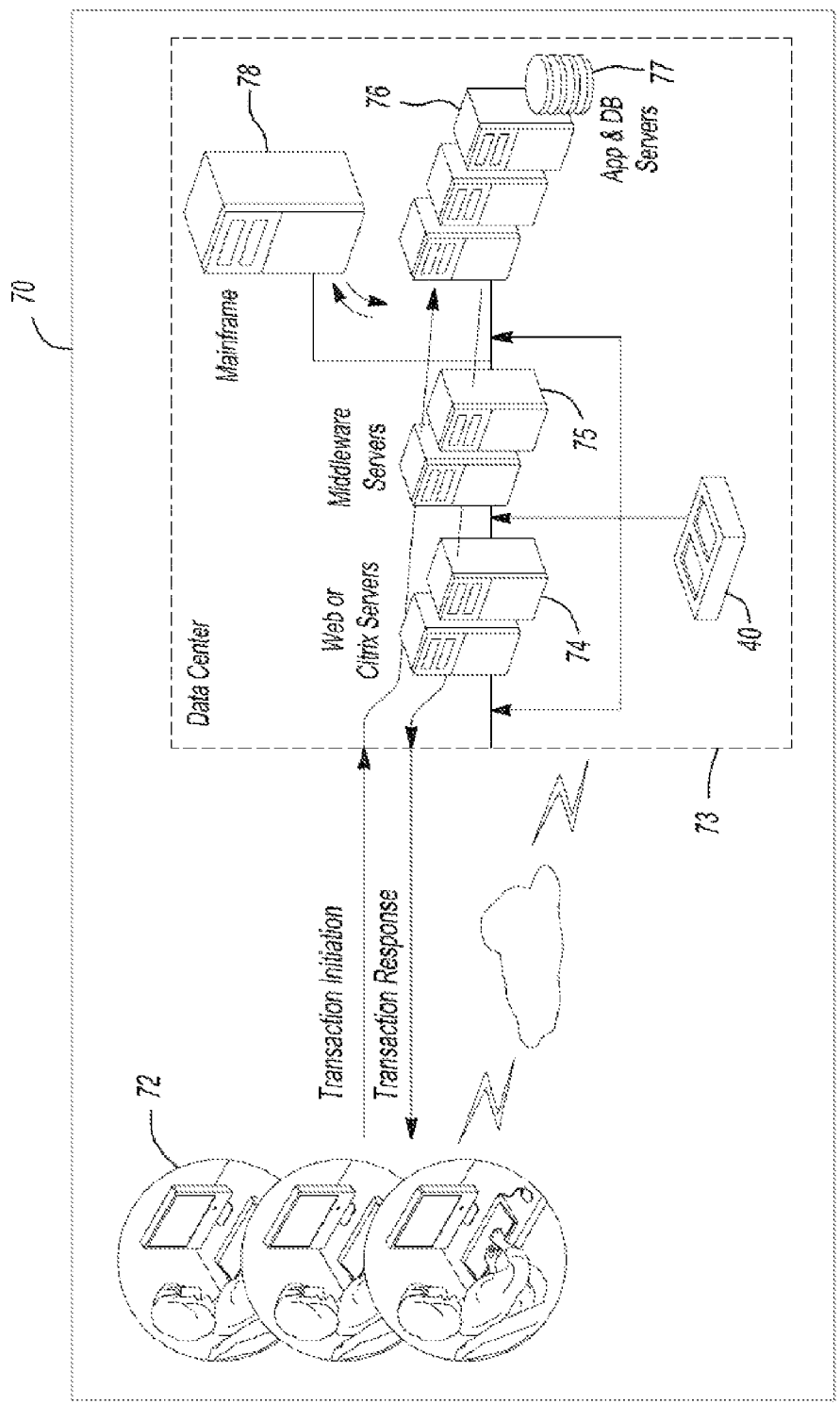
FIG. 7 is a diagram of an exemplary computing environment.

The method by which the service model template engine 46 constructs the service model 16 is further described in relation to the exemplary computing environment shown in FIG. 7. The computing environment 70 includes a plurality of software applications 72 communicating over a network with a computing data center 73. The data center 73 may be comprised of one or more web servers 74, middleware servers 75, application servers 76, database servers 77 and/or mainframe computers 78. In addition, various types of monitoring tools as described above may be hosted by the data center. These monitoring tools route messages encapsulating performance data via the data adapters 41 to the service model template engine 46. Other types of computing infrastructure components and arrangements thereof are contemplated by this disclosure.

Upon receiving a message, the service model template engine 46 first identifies which entities defined by the service model templates 49 are implicated by the message. To do so, the service model template engine 46 parses the messages and compares the message content to the filters for each of the service model templates. When the message content matches a template filter, the service model template engine 46 retrieves the instantiation rules associated with the matched service model template 49 and updates the service model 16 according to the retrieved rule set. It is understood that a given message can match more than one service model template. When the message does not match any of the template filters, the message is discarded by the service model template engine 46.

For illustration purposes, building of an exemplary service model is further described in relation to FIGS. 8A-8E. The service model template engine 40 receives a first transactional message related to the performance of a Commissions transaction. In this case, the message was received from a source having an identifier of 'ClientVANTAGE' and a message type of 'TransactionMetric'. The message content matches the service model template for an application_transaction entity having the following attributes:
  Entity identifier=application_transaction
  Source identifier=ClientVANTAGE
  Message format type=TransactionMetric
Given the match, the service model template engine 46 retrieves the instantiation rules associated with the application_transaction entity. In a simplified example, the service model template engine 46 determines what entities need to be created in the service model 16 based on the retrieved instantiation rules and checks the service model for the existence of such entities. When no corresponding entity exists in the service model, the service model template engine 46 implements the instantiation rule that creates a Commissions transaction node in the service model.

With reference to an exemplary arrangement of the service model templates in FIG. 9, the application_transaction entity 93 depends from an application entity 92 which in turn depends from an application_group entity 91. The application_group entity 91 will depend from a root node 90 designated as applications. In addition, an application_location_transaction entity 94 depends from the application_transaction entity 93. In an exemplary embodiment, the message type for each of these entities is also set to 'TransactionMetric' which means that messages of this type may also contain sufficient data for the service model template engine 46 to instantiate these entities as well. For example, the message may contain the name of the application and the name of the location where the transactional message originated from. Accordingly, the service model template engine 46 will retrieve service model templates 49 for the application and application_location_transaction entities and their associated instantiation rules. By implementing the retrieved instantiation rules, the service model template engine 46 creates the Accounting node and the Seattle Accounting Commissions node in the service model 16 as shown in FIG. 8A. In this example, the Accounting application does not belong to an application group although the service model templates support this hierarchy.

The service model template engine 46 may receive another transaction message related to the performance of the Commissions transaction. In this example, the transaction was originated from a different location (e.g., Montreal). The service model template engine 46 again retrieves the instantiation rules for the application entity, the application_transaction entity and the application_location_transaction entity.

Since the service model 16 does not include a node for this new location, the service model template engine 46 implements the instantiation rule for the application_location_transaction entity that creates this node (i.e., Montreal Accounting Commissions) in the service model 16 as shown in FIG. 8B. On the other hand, since the nodes for these other entities already exist in the service model 16, the processing entity disregards the rules that would create the Commissions node and the Accounting node in the service model.

Next, the service model template engine 46 may receive a transaction message related to the performance of a different transaction originating from the Seattle location. For example, the transaction type is identified as Support. The contents for this transaction message also match the template filter for the application entity, the application_transaction entity, and the application_location_transaction entity. Thus, the service model template engine 46 retrieves the instantiation rules for each of these entities. In this example, the service model template engine 46 implements an instantiation rule that creates a node for the transaction type (i.e., Support node) as well as the rule that creates a node for the transaction location (i.e., Seattle Accounting Support node) as shown in FIG. 8C. Since the Accounting node already exist in the service model, the service model template engine 46 disregards the rules that would create this node in the service model 16 but creates a link in the service model between the Support node and the Accounting node.

Visibility of the infrastructure that supports a given application is derived from interactions between the service model template engine 46 and other monitoring tools hosted by the data center. For example, transactions from the Accounting application may be handled by a web server whose performance is monitored by a server monitoring tool, such as ServerVANTAGE. The server monitoring tool will in turn send messages with performance data to the service model template engine 46.

Continuing with the example above, the service model template engine 46 receives a message related to the performance of a web server. In this case, the message content matches the service model template for a server entity having the following attributes:
　　Entity identifier=web_server
　　Source identifier=ServerVANTAGE
　　Message format=SoftwareService
Given the match, the service model template engine 46 retrieves the instantiation rules associated with the server entity. Since no corresponding service exists in the service model, the service model template engine 46 implements the instantiation rule that creates a web server node in the service model 16.

With reference to FIG. 9, the service model template for the server entity 96 is linked by an application_infrastructure entity 95 to the application entity 92. In an exemplary embodiment, this message format may also include data about an application being supported by the web server and matches the filter of the service model template for the application_infrastructure entity. The service model template engine 46 will retrieve the instantiation rules associated with this entity and create the Accounting Infrastructure node in the service model as shown in FIG. 8D. It is also envisioned that the data linking a software application to the respective computing infrastructure that supports the software application may reside in a message having a different format. In this case, the Accounting Infrastructure node is instantiated at some later time upon receipt of this message type by the service model template engine 46.

Likewise, the service model template engine 46 may receive messages related to the performance of a middleware server and/or a database server which support the accounting applications. The service model template engine 46 again retrieves the instantiation rules for the server entity and determines what services need to be created in the service model 16. Since the service model does not include a node for either of these types of servers, the service model template engine implements an instantiation rule that creates these nodes in the service model. On the other hand, since the Accounting Infrastructure node for this entity already exist in the service model, the service model template engine 46 need only to link these newly instantiation nodes to the Accounting Infrastructure node as shown in FIG. 8E.

An exemplary technique for learning the relationship between an application and its supporting computing infrastructure is further described below. For illustration purposes, a software service (or a performance monitoring tool associated therewith) monitors the uniform resource locators (URLs) used by the transactions interacting with the software service. For example, a server monitoring tool can monitor search queries to a web server made by different transactions. In an exemplary embodiment, the URLs detected by the server monitoring tool are ordered based on frequency of occurrence. The most frequent URLs can then be compared to a listing of URLs used by a given transaction. In an exemplary embodiment, the listing of URLs used by the given transaction is configured in the performance monitoring tool that monitors the transaction, such as the ClientVANTAGE Agentless tool. When a match occurs between URLs (or some portion thereof), the web server is presumed to support the given transaction. This comparison function may be executed by the server monitoring tool. Rather than link the software service to a given transaction, it may be preferably to link the software service to the application from which the transaction depends. In this way, the relationship between a software service and an application can be learned by the server monitoring tool.

When the service model template engine 46 subsequently receives a message related to the performance of a web server, the message will contain data identifying the application (or transaction) that is supported by the web server. The service model template engine in turn uses this information to update the service model as described above. While the above example relates to monitoring URLs, it is readily understood that this technique can be extended to other types of traffic (e.g., SQL queries, XML-based SOAP calls, etc.) and thereby learn other types of links between a software application and the respective computing infrastructure that supports the software application.

Over time, the service model template engine 46 continues to update the service model so that it accurately reflects the computing environment. FIGS. 10A and 10B illustrate an example of how the service model template engine automatically reclassifies entities and updates the service model accordingly. In FIG. 10A, the service model was initially constructed having a dependency between a particular web server and the physical server (i.e., Server X) on which it runs.

The service model template engine may receive a subsequent message which implies that the entity labeled 'Server X' is a virtual server. For example, the new message states that 'Server Y' is the new host for 'Server X'. This indicates that the entity labeled as 'Server X needs to be re-classified from a (physical) server type to a virtual server type, a physical server entity needs to be created for Server Y and a dependency link needs to be created from Server X entity to Server Y entity in the service model. Based on this new message, the service model template engine 46 implements these instantiation rules, thereby yielding the updated service model shown in FIG. 10B. Moving virtual servers between physical machines is a common occurrence but merely illustrates how the service model template engine 46 functions to maintain the accuracy of the service model over time and thereby improve the impact analysis performed by the performance management tool.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A computer-implemented method for updating a service model that defines entities in an enterprise's computing environment, comprising:
providing a group of templates for updating the service model, each template in the group of templates identifies a type of entity in the service model and specifies a relationship between the entity type and at least one other entity type in the service model, where the group of templates includes a template for a linking entity that specifies a relationship between a software function available to end users and computing infrastructure that supports the software functions;
monitoring messages received from monitoring tools residing in the computing environment; and
updating, by a service model template engine, a relationship between entities in a service model using data encapsulated in the messages in accordance with the template for the linking entity, where the service model template engine is implemented as computer executable instructions executed by a computer processor.

2. The method of claim 1 further comprises identifying computing infrastructure that supports a given software function experiencing a performance problem using the updated service model.

3. The method of claim 1 further comprises defining templates in the group of templates to include an entity identifier for the entity type and a source identifier that identifies a data source for messages having data pertaining to the entity.

4. The method of claim 3 further comprises defining templates in the group of templates to further include an attribute for the entity whose value is encapsulated in a given message and mapping the attribute in the template to a field in the given message from which to retrieve the value for the attribute.

5. The method of claim 4 wherein updating the service model further comprises retrieving a value for the attribute from the field in the given message and updating the attribute with the value retrieved from the message.

6. The method of claim 1 further comprises monitoring transactions handled by a software service in the computing infrastructure;
associating the monitored transactions with a given software function from which the transactions originated from; and
instantiating a link in the service model between the software service and the given software function using the linking entity.

7. The method of claim 1 further comprises representing the group of templates using a connected acyclic graph, thereby defining relationships between the types of entities.

8. The method of claim 3 further comprises defining templates in the group of templates to further include rules for updating the service model.

9. The method of claim 8 wherein updating a service model further comprises identifying which templates in the group of templates are implicated by a given message; retrieving rules for updating the service model from the identified templates; and updating the service model using the retrieved rules.

10. A computer-implemented method for updating a service model that defines entities in an enterprise's computing environment, comprising:
(a) receiving a message from a monitoring tool residing in the computing environment, where message encapsulates data indicative of performance of a given entity in the computing environment;
(b) comparing, by a service model template engine, the message to a group of templates, where the group of templates define different types of entities which comprise the service model and relationships between the types of entities;
c) retrieving, by the service model template engine, one or more templates in the group of templates having attributes that match data contained in the message;
(d) instantiating, by the service model template engine, a dependent entity in the service model and creating a dependence relationship between the dependent entity and the given entity using instantiation rules associated with the retrieved templates, where the service model template engine is executed by a computer processor.

11. The method of claim 10 further comprises
receiving a subsequent message from a monitoring tool in the computing environment;
comparing the message to a group of templates and retrieving one or more templates in the group of templates having attributes that match data contained in the subsequent message; and changing the dependence relationship between the dependent entity and the given entity in the service model using instantiation rules associated with the retrieved templates.

12. The method of claim 11 further comprises instantiating another entity in the service model and creating a dependence relationship between the another entity and the dependent entity.

13. The method of claim 12 further comprises deleting in the service model the dependence relationship between the dependent entity and the given entity.

14. The method of claim 10 further comprises defining templates in the group of templates to include an entity identifier for the entity type and a source identifier that identifies a data source for messages having data pertaining to the entity.

15. The method of claim 14 further comprises defining templates in the group of templates to include an attribute for the entity whose value is encapsulated in a given message and mapping the attribute in the template to a field in the given message from which to retrieve the value for the attribute.

16. The method of claim 10 further comprises defining one template in the group of templates for an entity that represents a software function available to end users and defining another template in the group of templates for another entity that represents a software service that supports software functions.

17. The method of claim 16 further comprises defining one template in the group of templates for an application infrastructure entity, where the application infrastructure entity creates a dependency relationship between a software function available to end users and a software service that supports the software function.

18. The method of claim 17 further comprises
monitoring transactions handled by a software service in the computing infrastructure;
associating the monitored transactions with a given software function from which the transactions originated from; and
instantiating a link in the service model between the software service and the given software function using the application infrastructure entity.

19. The method of claim 18 further comprises identifying computing infrastructure that supports a given software function experiencing a performance problem using the updated service model.

* * * * *